May 27, 1924.
J. F. KARNS
COFFEEPOT
Filed Aug. 11, 1923
1,495,598
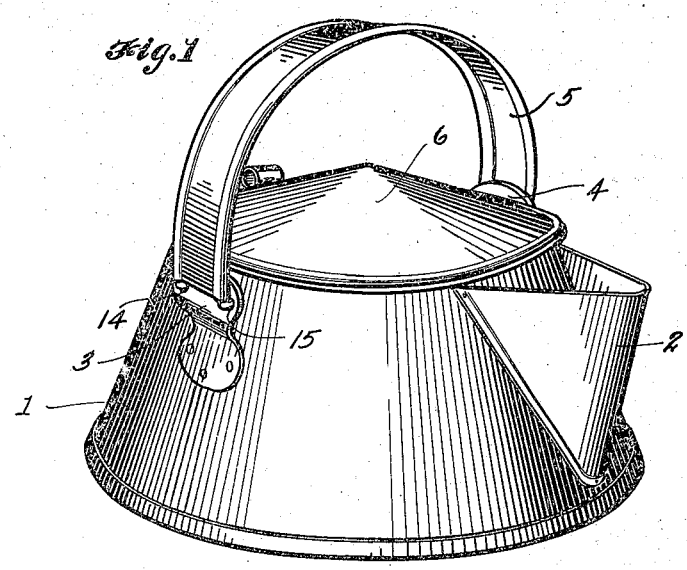
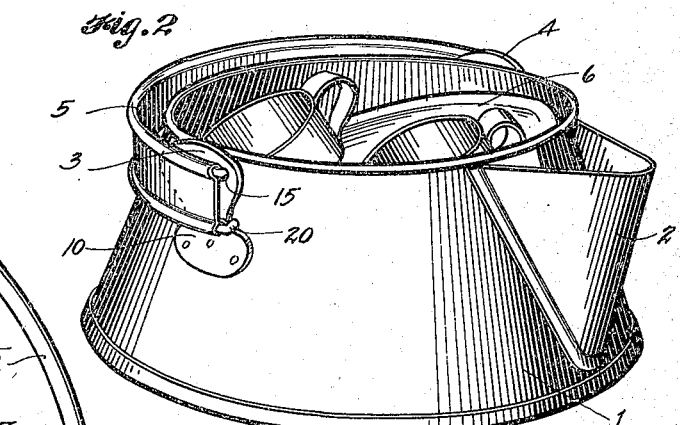
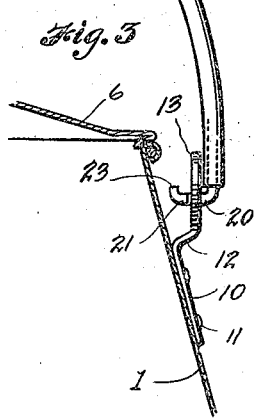
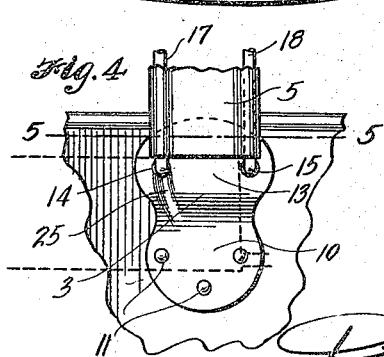
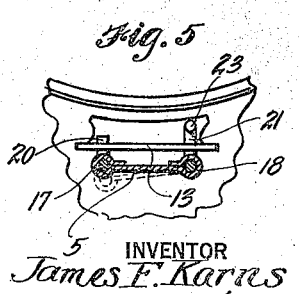
INVENTOR
James F. Karns
BY
Richard J. Cook
ATTORNEY Patented May 27, 1924.

1,495,598

UNITED STATES PATENT OFFICE.

JAMES F. KARNS, OF EVERETT, WASHINGTON.

COFFEEPOT.

Application filed August 11, 1923. Serial No. 656,902.

*To all whom it may concern:*

Be it known that I, JAMES F. KARNS, a citizen of the United States, and a resident of Everett, Snohomish County, Washington, have invented certain new and useful Improvements in Coffeepots, of which the following is a specification.

This invention relates to improvements in coffee pots, and the like, and more particularly to coffee pots of that character best suited for use by campers for boiling coffee over an open fire.

The principal object of the invention is to provide a coffee pot having a bail of novel construction provided with means for effecting a rigid connection with the coffee pot whereby the latter may be tilted for pouring by means of the bail alone and which also provides for a pivotal movement of the bail which permits it to be folded about the pot so as to occupy a minimum amount of space for packing or storing.

Another object of the invention resides in the details of construction of the bail, which has spring metal wires inclosed within its edges to provide the required tension for retaining the bail in position and which provides means for connecting the bail with the coffee pot.

Another object of the invention resides in the various details of construction and in the combination of parts embodied by the present invention.

In accomplishing these and other objects of the invention, I have provided the improved details of construction, the preferred forms of which are illustrated in the accompanying drawings, wherein—

Figure 1 is a perspective view of a coffee pot having the bail constructed and applied to the pot in accordance with the present invention.

Figure 2 is a perspective view showing the bail folded about the pot in position for packing.

Figure 3 is a detail view illustrating the manner of connecting the ends of the bail with the body of the coffee pot.

Figure 4 is a side view of the bail connecting ears and the end portion of the bail.

Figure 5 is a horizontal section taken on the line 5—5 in Figure 4.

Referring more in detail to the drawings—

1 designates what may be a coffee pot constructed of sheet metal in truncated conical form provided with a pouring spout 2 and at opposite sides equally spaced from the spout it has ears 3 and 4 secured thereto to which the opposite ends of a bail 5 are secured. A cover 6 is removably fitted over the pot and is of such size that it may be inserted within the latter with the cups and spoons, as shown in Figure 2, so that when the device is not in use it may be stored or packed in a minimum amount of space. Each of the ears 3 and 4 comprises a lower attaching portion 10 that is secured by rivets 11, or the like, to the side walls of the pot, an outwardly and upwardly spacing portion 12 and a vertically directed body portion 13 provided with horizontally alined and spaced apart openings 14 and 15. The bail 5 in its preferred construction comprises a strip of metal with its opposite longitudinal edges curved about spring metal wires 17 and 18 which are for the purpose of strengthening the bail and which retains it yieldingly in semicircularly curved form. The ends of the bail are disposed adjacent the outer sides of the ears 3 and 4 and the wires 17 and 18 extend from the ends of the bail and are turned inwardly to project through the openings 14 and 15 to mount the bail. The inturned end portions 20 at the opposite ends of the wire 17 terminate just within the openings through the ears while the inturned ends 21 at the opposite ends of the wire 18 extend farther through the opening and have upturned stop portions 23 which will prevent these wires from being unseated from their openings. The tension provided by the two wires within the bail normally retains the ends of the wires seated within the ear openings and thereby provides a rigid connection and permits tilting of the pot by means of the handle.

When it is desired to fold the bail downwardly, as shown in Figure 2, the ends of the bail are pulled apart so as to unseat the inturned ends 20 of the wires 17 from the openings 14 so that the bail may then swing pivotally about the inturned portions 21 of the wires 18. It will be noted that the laterally turned ends 23 of the wires 18 will prevent disconnection of the bail from the ears. To again connect the bail for use it is only necessary to swing it upwardly from position, as shown in Figure 2, to vertical position, as shown in Figure 1, and the tension of the wires will move the inturned ends of wire 17 into their openings as they are brought into registration.

I have provided the ears with guide grooves 25 curved radially about the center of openings 15 and leading into the openings 14 along which the inturned ends of the wires 17 may pass.

It is intended in this construction to so slope the side walls of the coffee pot that when the bail is not in folded position, it will lie within the area of the bottom of the pot so as not to cause inconvenience in packing, and it is also provided to make the walls sufficiently flexible that they may be sprung when it is desired to insert the cover within the pot.

With the device so constructed it is readily apparent that when the bail is in upright position, it has a rigid connection with the ears and will serve as a means of handling the pot and of tilting it for pouring process, and that when the ends of the bail are drawn apart, the bail may then be folded downwardly along the body of the pot so that it requires no unnecessary space for storing.

Having thus described my invention, what I claim as new therein and desire to secure by Letters Patent is:

1. A coffee pot having bail mounting ears at its opposite sides provided with spaced apart openings and a yieldable bail having laterally turned projections of different length at its ends adapted to seat within said openings to provide a rigid connection and whereby when the ends are sprung apart to unseat the shorter of said projections, the bail may be moved pivotally.

2. A coffee pot having bail mounting ears at its opposite sides provided with spaced apart openings and a bail having inturned projections at its ends seated within said openings; the projections seated within corresponding openings of the two ears being longer than the other projections and provided with laterally turned stop portions for the purpose set forth.

3. A coffee pot of the character described having bail mounting ears at its opposite sides provided with spaced openings, a bail having spring metal wires inclosed within its longitudinal edges and extending from the ends of the bail with inturned ends seated removably within said openings.

4. A coffee pot of the character described having bail mounting ears at its opposite sides provided with spaced openings, a bail having spring metal wires inclosed within its longitudinal edges and extending from the ends of the bail with inturned ends seated removably within said openings; the inturned ends of one of said wires being longer than the inturned ends of the other to permit unseating of the shorter ends and pivotal movement of the bail without unseating the longer ends.

5. A coffee pot having bail mounting ears at its opposite sides provided with horizontally spaced apart openings, a bail comprising a strip of metal with spring metal tensioning wires inclosed within its longitudinal edges and extended from the ends of the bail and having inturned end portions slidably seated within said ear openings; the inturned ends of one of said wires being longer than the ends of the other wire and provided with laterally turned stop portions at their ends for preventing the unseating of these wires from the openings.

6. A coffee pot having bail mounting ears at its opposite sides provided with spaced apart openings and having a guide groove curved laterally about one of said openings and leading into the other of the said openings and a bail having tensioning wires inclosed within its longitudinal edges and extending from the ends of the bail with inturned ends seated within said ear openings; the inturned ends of one of said wires being shorter than the inturned end portions of the other wire so that the shorter ends may be unseated without unseating the other; said shorter ends being adapted to fall within said guide grooves during pivotal movement of the bail.

Signed at Seattle, King County, Washington, this 1st day of August 1923.

JAMES F. KARNS.